United States Patent
Löffler et al.

(10) Patent No.: US 6,236,928 B1
(45) Date of Patent: May 22, 2001

(54) METHOD AND DEVICE FOR DETERMINING A VARIABLE REPRESENTING THE ROAD RESISTANCE ON A MOTOR VEHICLE

(75) Inventors: Jürgen Löffler, Winnenden; Rasmus Frei, Ludwigsburg; Andrea Steiger-Pischke, Weissach; Martin-Peter Bolz, Oberstenfeld; Marko Poljansek, Routlingen; Wolfgang Hermsen, Rodgau; Holger Hülser, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,040
(22) PCT Filed: Aug. 29, 1998
(86) PCT No.: PCT/DE98/02546
§ 371 Date: Jun. 1, 1999
§ 102(e) Date: Jun. 1, 1999
(87) PCT Pub. No.: WO99/16643
PCT Pub. Date: Apr. 8, 1999

(30) Foreign Application Priority Data

Sep. 30, 1997 (DE) ............................... 197 43 059

(51) Int. Cl.$^7$ .................................................. B60R 16/02
(52) U.S. Cl. ............................................ 701/82; 180/197
(58) Field of Search ........................... 701/80, 82, 70, 701/74; 180/197

(56) References Cited

U.S. PATENT DOCUMENTS

| | | |
|---|---|---|
| 4,625,590 | 12/1986 | Müller . |
| 5,231,897 | 8/1993 | Morita . |
| 5,465,208 | 11/1995 | Kenji et al. . |
| 5,557,519 | 9/1996 | Morita . |
| 5,813,942 * | 9/1998 | Nakagawa et al. .................. 477/120 |
| 5,908,461 * | 6/1999 | Tsukamoto et al. ................... 701/56 |
| 6,059,064 * | 5/2000 | Nagano et al. ....................... 180/243 |

FOREIGN PATENT DOCUMENTS 0532957 3/1993 (EP) .

* cited by examiner

Primary Examiner—Michael J. Zanelli
(74) Attorney, Agent, or Firm—Walter Ottesen

(57) ABSTRACT

The invention proceeds from a motor vehicle having a drive train and the elements of the drive train are rotatable. The determination of a quantity, which represents the traction resistance, takes place in such a manner that an acceleration quantity is detected. This acceleration quantity represents the instantaneous acceleration of the vehicle. Furthermore, a reference quantity for the acceleration of the vehicle is detected and the quantity, which represents the traction resistance, is determined in dependence upon a comparison of the detected acceleration quantity with the determined reference quantity. The essence of the invention is that a rotation quantity is determined which represents the rotation torque of at least one element mounted in the drive train. The determination of the reference quantity takes place in accordance with the invention in dependence upon the determined rotation quantity. It is especially provided that the rotation quantities of individual elements, which are mounted in the drive train, are determined separately.

6 Claims, 4 Drawing Sheets

METHOD AND DEVICE FOR DETERMINING A VARIABLE REPRESENTING THE ROAD RESISTANCE ON A MOTOR VEHICLE

FIELD OF THE INVENTION

The invention relates to a method and an arrangement for determining a quantity representing the traction resistance in a motor vehicle.

BACKGROUND OF THE INVENTION

In the drive train of a motor vehicle, various components are arranged such as the vehicle engine, engine ancillary equipment (for example, current generator, climate control system), a clutch, a torque converter, a transmission having a transmission ratio which can be varied, a differential transmission and/or the driven vehicle wheels. To optimize the drive train control, it is necessary to use information as to the actual load state or the actual traction resistance of the vehicle. An increased traction resistance occurs, for example, when driving uphill and by a change of the drag coefficient of the vehicle. An increased traction resistance generates a driving situation to which the control of the drive train should react in a suitable manner. Especially, an adaptation of the strategy for transmission ratio determination is advantageous.

Electronic transmission controls are provided with algorithms for detecting load or traction resistance. Shift characteristic lines are shifted and/or further measures are initiated to avoid up and down gear shifting in dependence upon the detected load or the detected traction resistance. For the detection, a comparison of the actual vehicle longitudinal acceleration to the expected vehicle longitudinal acceleration is made, for example. For this purpose, the expected vehicle longitudinal acceleration is to be determined.

The Patent DE 30 18 032 C2 (U.S. Pat. No. 4,625,590) describes a method wherein the expected vehicle longitudinal acceleration is determined with the aid of the output torque. Here, the efficiency of the drive train is considered. The result determined in this manner is, however, only correct for steady-state driving operation because the torques, which are required for acceleration and deceleration of the rotating masses in the drive train, are not considered.

A method is described in DE 41 38 822 C2 (U.S. Pat. No. 5,557,519) wherein the mass of the vehicle is increased by a "rotation mass" in order to compensate for this effect. This procedure however requires a gear-dependent correction of this "rotation mass".

SUMMARY OF THE INVENTION

The object of the present invention is to determine the actual traction resistance very precisely with the least possible adaptation complexity.

As mentioned, the invention proceeds from a motor vehicle having a drive train wherein the elements of the drive train are rotatable. Such elements include the vehicle engine, the engine ancillary equipment, the clutch, the torque converter, the transmission changeable with respect to its transmission ratio, the differential and/or the wheels of the vehicle. The determination of a variable representing the traction resistance takes place in such a manner that an acceleration quantity is detected which represents the instantaneous acceleration of the vehicle. Furthermore, a reference quantity for the acceleration of the vehicle is determined and the variable representing the traction resistance is determined in dependence upon a comparison of the detected acceleration quantity with the determined reference quantity.

The essence of the invention is that a rotational quantity is determined which represents the rotation torque of at least one element mounted in the drive train. The determination of the reference quantity takes place in accordance with the invention in dependence upon the determined rotation quantity. It is especially provided that the rotation quantities of individual elements, which are mounted in the drive train, are determined separately.

The traction resistance can be very precisely determined by considering the torque required for the deceleration or acceleration of each individual component of the drive train. The separate consideration of each individual component of the drive train permits a simple variant formation. Thus, for example, for a change of the gear shifting steps of the built-in transmission, only that part of the determination of the rotation quantity according to the invention must be modified which concerns the component "transmission". An adaptation of global characteristic variables is not required.

It is especially advantageous that rotational movement quantities, which represent the instantaneous rotational movement of the elements mounted in the drive train, are detected. The particular rotation quantity is then determined in dependence upon the detected instantaneous rotational movement of the particular element. Here, it is especially provided that the rotational movement quantities detect the instantaneous rotational velocities of the elements.

The traction resistance is elementarily determined by considering the rotational movements of the individual components which, inter alia, are different for the individual components. In this way, an application of empirical characteristic variables is not necessary because of the physical basis. In this way, the complexity of adaptation is reduced.

Furthermore, it is advantageous that the determination of the reference quantity takes place in such a manner that a wheel drive torque quantity and/or a wheel power quantity is formed in dependence upon the determined rotation quantities. The wheel drive torque quantity represents the torque outputted by the wheels and the wheel power quantity represents the power outputted at the wheels.

BRIEF DESCRIPTION OF THE DRAWINGS

FIG. 1 shows an overview schematic for determining the traction resistance; whereas.

DESCRIPTION OF THE PREFERRED EMBODIMENTS OF THE INVENTION

The invention will now be explained in detail in the following with respect to an embodiment.

The traction resistance can be determined with a comparison of the expected longitudinal acceleration $a\_L,exp$ to the actual longitudinal acceleration $a\_L$. For this purpose, it is necessary to determine the actual vehicle acceleration. This is determined over a time interval $(t_0-T, t_0)$. In this time interval, the expected acceleration is likewise to be determined.

Figure 1:
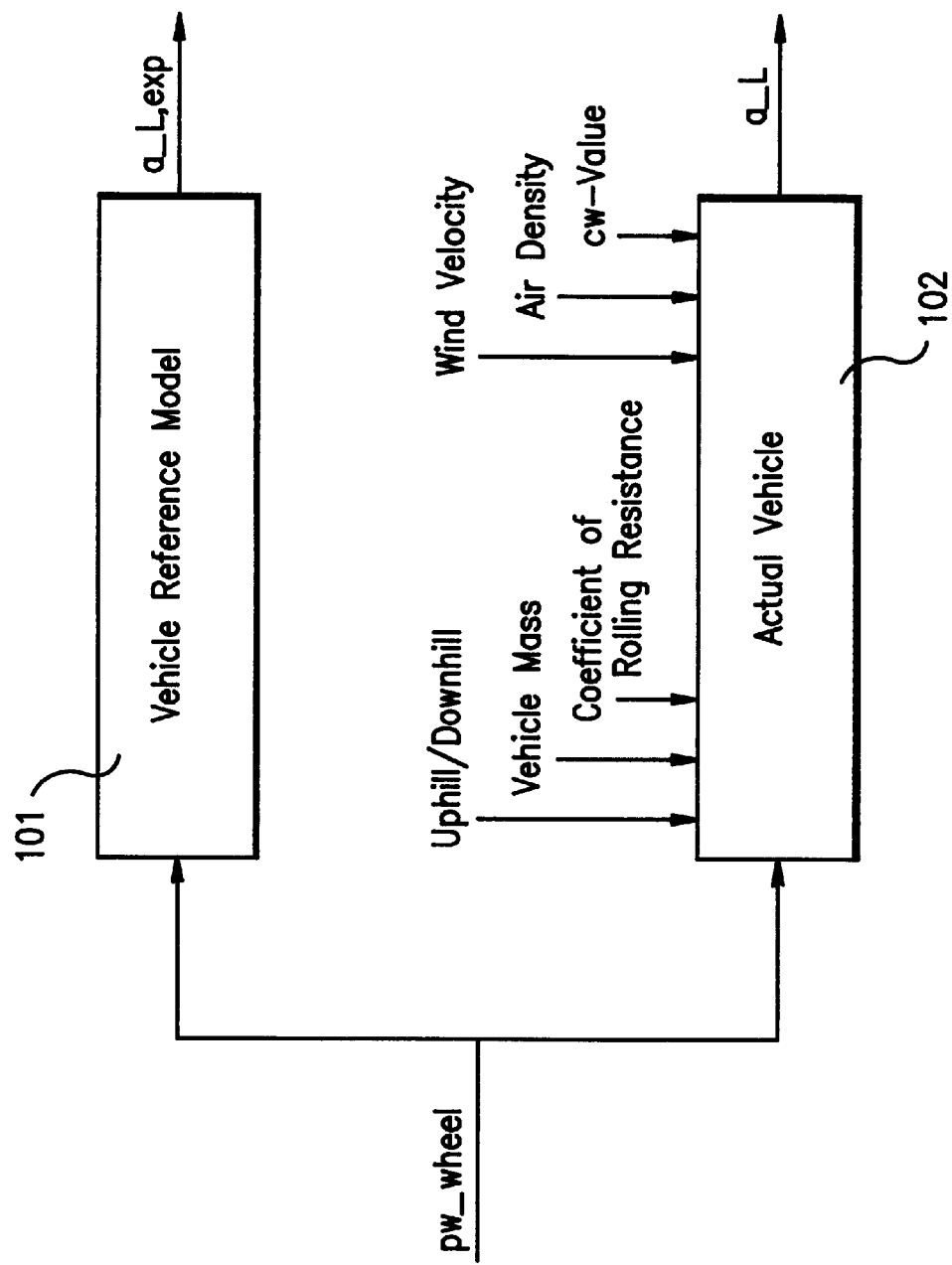

The principle and the influence quantities on the real acceleration are shown in FIG. 1. The real vehicle is identified by block 102 and is subjected to specific quantities (for example, uphill roadway, downhill roadway, vehicle mass, coefficient of rolling resistance, wind velocity, air density, coefficient of air resistance/cw-value) which influence the traction resistance. The real vehicle 102 realizes the instantaneously present longitudinal acceleration a_L because of the power pw_wheel which is outputted by all of the vehicle wheels taken together.

A value a_L,exp is determined for the expected longitudinal acceleration by means of a vehicle reference model 101 in order to determine the traction resistance. The most important quantity for the determination of the expected longitudinal acceleration a_L,exp is here also the power pw_wheel outputted by all of the vehicle wheels.

As mentioned, the determination the expected longitudinal acceleration a_L,exp takes place on the basis of the drive power pw_wheel outputted by all of the wheels of the vehicle.

Figure 2:
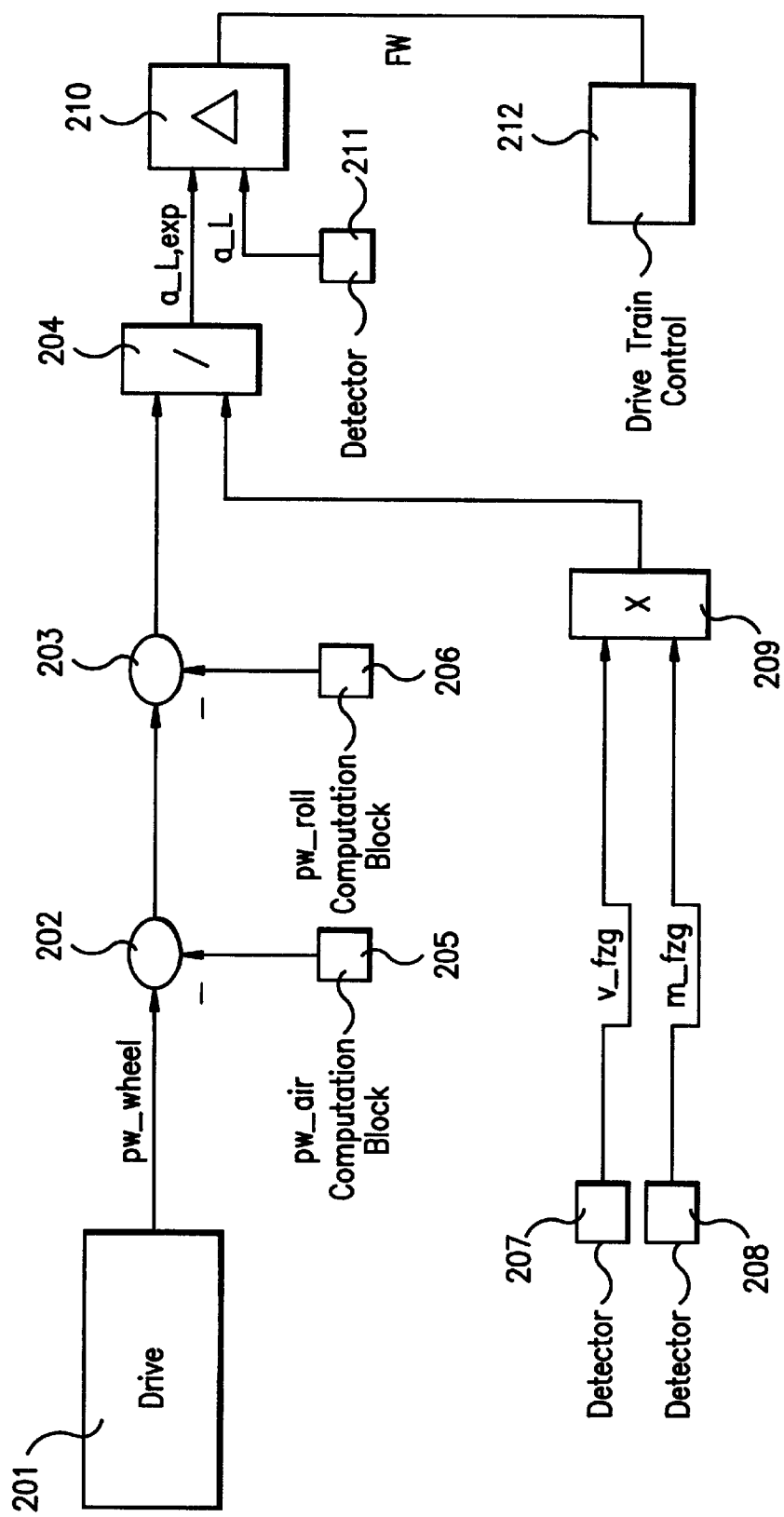
FIG. 2 shows the determination of the expected longitudinal acceleration.

FIG. 2 shows the computation rule for determining the expected longitudinal acceleration a_L,exp. These are to be averaged over the time interval $(t_0-T, t_0)$ For this purpose, the power pw_wheel outputted by all of the wheels is determined in the block 201 which is yet to be described. From this value, the loss powers pw_air and pw_roll for overcoming the air resistance and roll resistance are subtracted in the logic elements 202 and 203. The loss powers pw_air and pw_roll are determined in blocks 205 and 206. These loss powers can be determined as follows:

$$pw\_air=0.5*rho\_air*cw*(v\_fzg)^3*A$$

$$pw\_roll=f\_roll*m\_fzg*g*v\_fzg$$

wherein: rho_air represents the air density; cw represents the coefficient of air resistance; A is the end face; v_fzg is the vehicle longitudinal velocity; m_fzg is the vehicle mass; and, g is the acceleration due to gravity.

In block 204, the power value is divided by the product of the vehicle mass m_fzg and the vehicle longitudinal velocity v_fzg in order to obtain the expected longitudinal acceleration a_L,exp. The power value is determined while considering the air resistance and the roll resistance.

The detection of the actual longitudinal acceleration a_L, which acts on the real vehicle, takes place in block 211, for example, by an evaluation of the wheel rpms.

In block 210, the actual traction resistance FW is determined from a comparison of the actual longitudinal acceleration a L and the expected longitudinal acceleration a L,exp. This value FW is then further processed in the drive train control 212, for example, for adapting the shift characteristic lines to the instantaneously present traction resistance.

The computation block "drive 201" supplies the power outputted by all of the wheels. This is:

$$pw\_wheel=md\_wheel*n\_wheel$$

wherein: md_wheel is the torque outputted by all of the driven wheels and n_wheel is the mean wheel rpm of the driven wheels.

The torque md_wheel is determined by considering the torques transmitted in the drive train.

Figure 3:
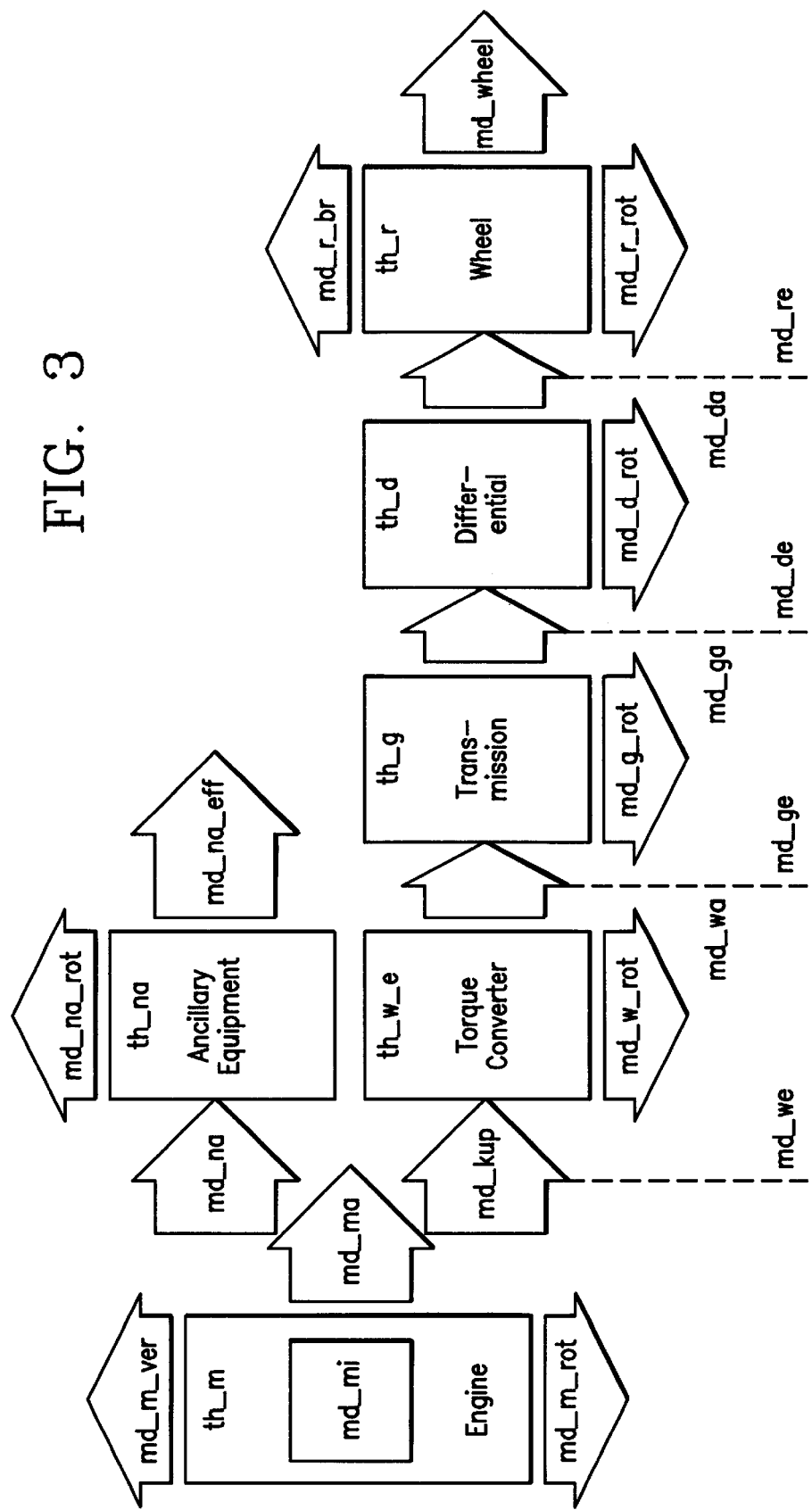
FIG. 3 discloses the torque ratios in the drive train.

For determining the transmitted torques, the rotational torque is considered for each component of the drive train. This rotational torque is necessary for acceleration or deceleration and results as the product of the mass moment of inertia and the angular acceleration. FIG. 3 shows the allocation of the quantities to the individual components in the drive train.

The abbreviations used relate to input quantities, output quantities and internal quantities of the components. The components are not necessarily identical to components in the drive train. The following components are considered:

The engine having the effective engine inertial torque th_m driven by the indicated torque md_mi and burdened with the loss torque md_m_loss.

The ancillary equipment; here, all equipment, which is mechanically connected in a fixed gear ratio with the engine crankshaft, is considered as ancillary equipment (for example, current generator, climate control system). The ancillary equipment all take the torque md_na from the crankshaft and have together a mass moment of inertia th_na.

The torque converter which includes hydrodynamic converters as well as friction clutches. The torque converter is characterized by an input-end mass moment of inertia th_w_e and an output-end mass moment of inertia th_w_a.

The transmission includes, for example, manual shift transmissions, stepped automatic transmissions and continuously variable transmissions. The transmission is characterized by an effective inertial torque th_g which is dependent upon the transmission ratio.

The differential. A single-track model is assumed in the drive train considered here. In this way, the differential has only one output rpm. This output rpm is characterized by the effective mass moment of inertia th_d.

The wheel. It is representative for all four wheels of the vehicle and is characterized by the mass moment of inertia th_r.

For determining the md_wheel, the output torque of each component of the drive train is computed. Here, the following variables are utilized:

| | |
|---|---|
| md_mi | Engine: indicated torque (the torque effected by the combustion operation) |
| md_m_loss | Engine: sum of loss torques |
| md_m_rot | Engine: rotation torque |
| md_ma | Engine: output torque |
| md_na | Ancillary equipment: sum of the torques taken up |
| md_na_rot | Ancillary equipment: sum of the rotation torques, referred to the crankshaft |
| md_na_eff | Ancillary equipment: sum of the effective utilized torques |
| md_kup | Clutch torque |
| md_we | Torque converter: input torque |
| md_w_rot | Torque converter: sum of the rotation torques |
| md_wa | Torque converter: output torque |
| md_ge | Transmission: input torque |
| md_g_rot | Transmission: rotation torque |
| md_ga | Transmission: output torque |
| md_de | Differential: input torque |
| md_d_rot | Differential: rotation torque |
| md_da | Differential: sum of output torques |
| md_an | Drive torque |
| md_rbr | Wheel: sum of brake torques |
| md_r_rot | Wheel: sum of the rotation torques |
| md_wheel | Wheel: sum of wheel torques |

Figure 4:
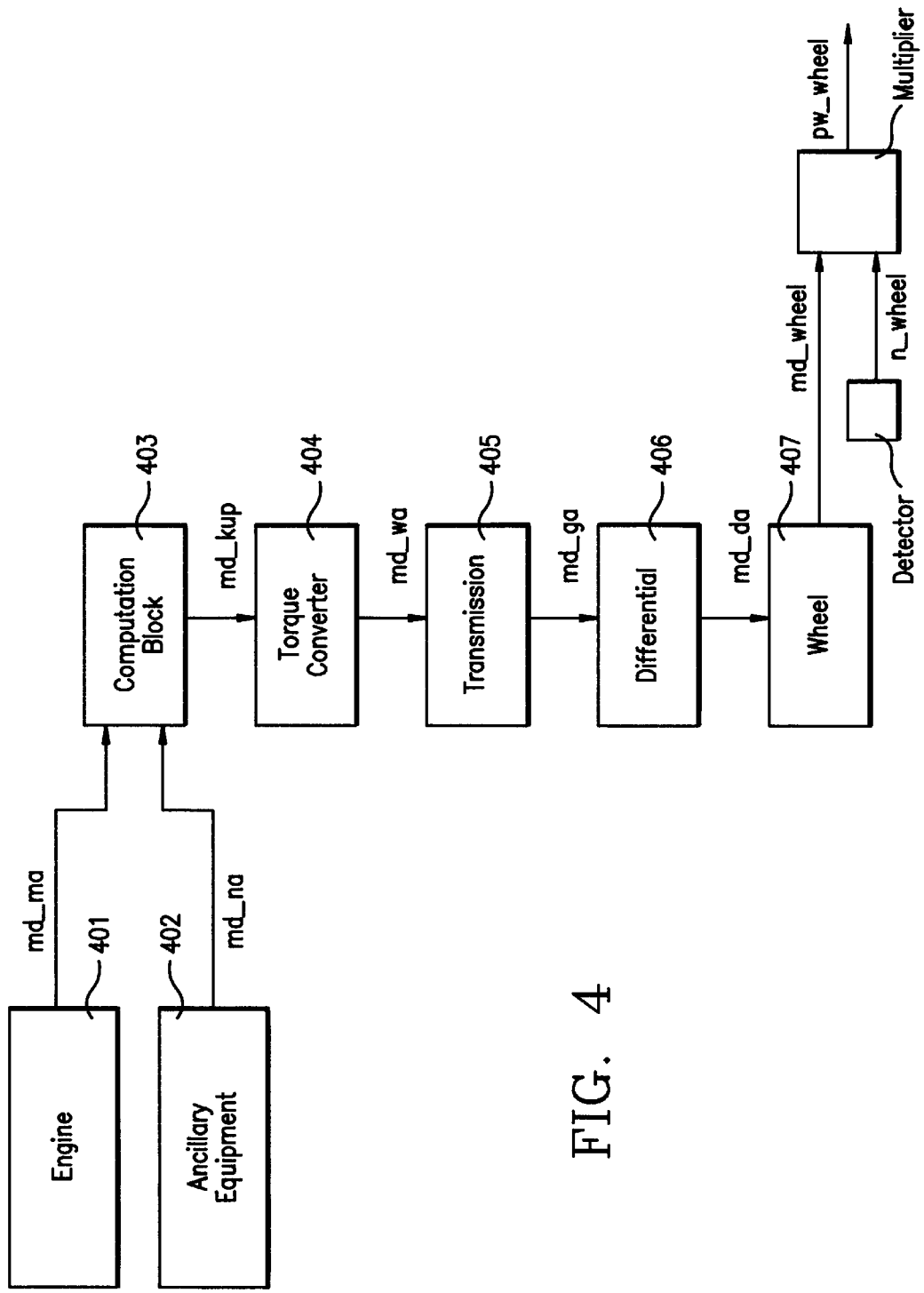
FIG. 4 provides the sequence of the determination of the drive power outputted by the wheels.

The computation of md_wheel is shown with respect to FIG. 4. The designation "_dot" placed behind a quantity is the time-dependent derivative of this quantity. Furthermore, pi=3.14159. For the transmission and differential, the mass moment of inertia is referred to the input end.

Computation block 401 (engine):

$$md\_ma = md\_mi - md\_mloss - md\_m\_rot,$$

$$md\_m\_rot = 2*pi*th\_m*n\_m\_dot$$

Computation block 402 (ancillary equipment):

$$md\_na = md\_na\_eff + md\_na\_rot$$

$$md\_na\_rot = 2*pi*th\_na*n\_m\_dot$$

Computation block 403 (clutch torque):

$$md\_kup = md\_ma - md\_na$$

Computation block 404 (torque converter):

$$md\_wa = ((md\_we - md\_w\_rot\_e)*mue\_w) - md\_w\_rot\_a$$

$$md\_w\_rot\_e = 2*pi*th\_w\_e*n\_we\_dot$$

$$md\_w\_rot\_a = 2*pi*th\_w\_a*n\_wa\_dot$$

wherein: mue_w is the steady-state torque conversion of the torque converter.

Computation block 405 (transmission):

$$md\_ga = (md\_ge - md\_g\_rot)*mue\_g$$

$$md\_g\_rot = 2*pi*th\_g*n\_ge\_dot$$

wherein: mue_g is the steady-state torque transmission of the transmission.

Computation block 406 (differential):

$$md\_da = (md\_ge - md\_d\_rot)*mue\_d$$

$$md\_d\_rot = 2*pi*th\_d*n\_de\_dot$$

wherein: mue_d is the steady-state torque transmission of the differential.

Computation block 407 (wheel):

$$md\_wheel = md\_an - md\_r\_br - md\_r\_rot$$

$$md\_r\_rot = 2*pi*th\_r*n\_wheel\_dot$$

In summary, it is noted that, by considering the torque, which is required for deceleration or acceleration of each individual component of the drive train, the torque md_wheel is computed with greater accuracy than in methods known to date. The quality of the determining algorithm is thereby increased.

With the physical basis of the determination, an adaptation of empirical characteristic quantities is not necessary. In this way, the complexity of adaptation is reduced.

The subdivision of the determination method into components permits a simple variant formation. Thus, only the computation block 405 in FIG. 4 must be modified, for example, for a change of the transmission ratio steps of the built-in transmission. An adaptation of global characteristic variables is not necessary, such as the consideration of the rotation torque with a "rotation total mass".

What is claimed is:

1. A method for determining a quantity, which represents the traction resistance for a motor vehicle, said motor vehicle having a drive train including rotatable elements arranged in said drive train including at least one of a vehicle engine, engine ancillary equipment, a clutch, a torque converter, a transmission variable with respect to its transmission ratio, a differential and vehicle wheels, the method comprising the steps of:

detecting an acceleration quantity (a_L) which represents the instantaneous acceleration of said vehicle;

separately determining a rotation quantity (md_m_rot, md_na_rot, md_w_rot_e, md_w_rot_a, md_g_rot, md_d_rot, md_r_rot) representing the rotation torque of at least one of the elements mounted in said drive train;

forming at least one of a wheel drive torque quantity (md_wheel) and a wheel power quantity (pw_wheel) in dependence upon the determined rotational quantities, said wheel drive torque quantity (md_wheel) representing the torque outputted at the vehicle wheels and said wheel power quantity (pw_wheel) representing the power outputted by the vehicle wheels;

determining a reference quantity (a_L,exp) for the acceleration of the vehicle in dependence upon at least one of the wheel drive torque quantity (md_wheel) and the wheel power quantity (pw_wheel); and, determining said quantity, which represents the traction resistance for a motor vehicle, in dependence upon a comparison of the detected acceleration quantity (a_L) with the determined reference quantity (a_L,exp).

2. The method of claim 1, wherein rotational movement quantities (n_m_dot, n_we_dot, n_wa_dot, n_ge_dot, n_de_dot, n_wheel) are detected, the rotational movement quantities representing the instantaneous rotational movement of the elements mounted in the drive train; and, the particular rotational quantity is determined in dependence upon the detected instantaneous rotational movement of the particular element, wherein the rotational movement quantities (n_m_dot, n_we_dot, n_wa_dot, n_ge_dot, n_de_dot, n_wheel) represent the instantaneous rotational accelerations of the elements.

3. Method of claim 1, wherein the determination of the reference quantity (a_L,exp) takes place in such a manner that at least one of the wheel drive torque quantity (md_wheel) and the wheel power quantity (pw_wheel) is formed in dependence upon the determined rotational quantities.

4. An arrangement for determining a quantity representing the traction resistance in a motor vehicle wherein rotatable elements are provided in the drive train of the vehicle and these rotatable elements including at least one of a vehicle engine, engine ancillary equipment, a clutch, a torque converter, a transmission changeable with respect to its transmission ratio, a differential and vehicle wheels, the arrangement comprising:

means for detecting an acceleration quantity (a_L) which represents the instantaneous acceleration of the vehicle;

means for separately determining a rotational quantity (md_m_rot, md_na_rot, md_w_rot_e, md_w_rot_a, md_g_rot, md_d_rot, md_r_rot) representing the rotation torque of at least one element mounted in the drive train;

means for forming at least one of a wheel drive torque quantity (md_wheel) and a wheel power quantity (pw_wheel) in dependence upon the determined rotational quantities, said wheel drive torque quantity (md_wheel) representing the torque outputted at the vehicle wheels and said wheel power quantity (pw_wheel) representing the power outputted by the vehicle wheels;

means for determining a reference quantity (a_L,exp) for the acceleration of the vehicle in dependence upon at least one of the wheel drive torque quantity (md_wheel) and the wheel power quantity (pw_wheel); and, means for determining said quantity, which represents the traction resistance for a motor vehicle, in dependence upon a comparison of the detected acceleration quantity (a_L) to the determined reference quantity (a_L,exp).

5. The arrangement of claim 4, wherein rotational movement quantities (n_m_dot, n_we_dot, n_wa_dot, n_ge_dot, n_de_dot, n_wheel) are detected, the rotational movements quantities representing the instantaneous rotational movement of the elements mounted in the drive train; and, the particular rotational quantity is determined in dependence upon the detected instantaneous rotational movement of the particular element, wherein the rotational movement quantities (n_m_dot, n_we_dot, n_wa_dot, n_ge_dot, n_de_dot, n_wheel) represent the instantaneous rotational accelerations of the elements.

6. The arrangement of claim 4, wherein the determination of the reference quantity (a_L,exp) takes place in such a manner that at least one of the wheel drive torque quantity (md_wheel) and the wheel power quantity (pw_wheel) is formed in dependence upon the determined rotational quantities.

* * * * *